(12) United States Patent
Zhang et al.

(10) Patent No.: US 10,416,378 B2
(45) Date of Patent: Sep. 17, 2019

(54) CHIP-TO-CHIP INTERCONNECT WITH EMBEDDED ELECTRO-OPTICAL BRIDGE STRUCTURES

(71) Applicant: Intel Corporation, Santa Clara, CA (US)

(72) Inventors: Zhichao Zhang, Chandler, AZ (US); Kemal Aygun, Chandler, AZ (US); Robert L. Sankman, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/979,382

(22) Filed: May 14, 2018

(65) Prior Publication Data

US 2018/0372952 A1    Dec. 27, 2018

Related U.S. Application Data

(63) Continuation of application No. 14/964,426, filed on Dec. 9, 2015, now Pat. No. 9,971,089.

(51) Int. Cl.
| | |
|---|---|
| *G02B 6/12* | (2006.01) |
| *G02B 6/42* | (2006.01) |
| *G02B 6/43* | (2006.01) |

(52) U.S. Cl.
CPC ......... *G02B 6/12004* (2013.01); *G02B 6/428* (2013.01); *G02B 6/4257* (2013.01);
(Continued)

(58) Field of Classification Search
CPC ........... G02B 2006/12121; G02B 2006/12142; G02B 2006/12147; G02B 6/12;
(Continued)

(56) References Cited

U.S. PATENT DOCUMENTS

| | | |
|---|---|---|
| 4,699,453 A | 10/1987 | Roberts |
| 6,198,864 B1 | 3/2001 | Lemoff |
| (Continued) | | |

FOREIGN PATENT DOCUMENTS

JP    2006-113566    4/2006

OTHER PUBLICATIONS

International Search Report and Written Opinion for International Patent Application No. PCT/US2016/055726, dated Jan. 25, 2017, 14 pages.

(Continued)

*Primary Examiner* — Andrew Jordan
(74) *Attorney, Agent, or Firm* — Schwabe, Williamson & Wyatt P.C.

(57) ABSTRACT

Techniques and mechanisms for providing a bridge between integrated circuit (IC) chips. In an embodiment, the bridge device comprises a semiconductor substrate having disposed thereon contacts to couple the bridge device to two IC chips. Circuit structures and photonic structures of a bridge link are integrated with the substrate. The structures include an optical waveguide coupled between an electrical-to-optical signal conversion mechanism and an optical-to-electrical conversion mechanism. The bridge device converts signaling from an electrical domain to an optical domain and back to an electrical domain. In another embodiment, optical signals received via different respective contacts of an IC chip are converted by the bridge device, where the optical signals are multiplexed with each other and variously propagated with the same optical waveguide.

9 Claims, 10 Drawing Sheets

(52) U.S. Cl.
CPC ............. *G02B 6/4295* (2013.01); *G02B 6/43*
(2013.01); *G02B 2006/12121* (2013.01); *G02B
2006/12142* (2013.01); *G02B 2006/12147*
(2013.01)

(58) Field of Classification Search
CPC .... G02B 6/12004; G02B 6/42; G02B 6/4257;
G02B 6/428; G02B 6/4295
See application file for complete search history.

(56) References Cited

U.S. PATENT DOCUMENTS

| | | | |
|---|---|---|---|
| 6,558,976 B2 | 5/2003 | Shrauger | |
| 6,668,113 B2 | 10/2003 | Togami | |
| 6,865,307 B1 | 3/2005 | Ma | |
| 6,888,988 B2 | 5/2005 | Vancoille | |
| 6,959,133 B2 | 10/2005 | Vancoille | |
| 7,206,471 B2 | 4/2007 | Sinsky | |
| 7,227,342 B2* | 6/2007 | McCune, Jr. | H02M 3/155 |
| | | | 323/225 |
| 7,264,408 B2 | 9/2007 | Togami | |
| 7,271,461 B2 | 9/2007 | Dutta | |
| 7,306,378 B2 | 12/2007 | Alduino | |
| 7,327,022 B2 | 2/2008 | Claydon | |
| 7,333,692 B1 | 2/2008 | Mossbert | |
| 7,399,125 B1 | 7/2008 | Whaley | |
| 7,430,127 B2 | 9/2008 | Uchida | |
| 7,539,367 B2 | 5/2009 | Tamura | |
| 7,556,440 B2 | 7/2009 | Birincloglu | |
| 7,654,750 B2 | 2/2010 | Brenner | |
| 7,745,832 B2 | 6/2010 | Hsieh | |
| 8,019,187 B1 | 9/2011 | Dutta | |
| 8,197,147 B2 | 6/2012 | Lee | |
| 8,227,904 B2 | 7/2012 | Braunisch et al. | |
| 8,283,678 B2 | 10/2012 | Morioka | |
| 8,335,411 B2 | 12/2012 | Kuznia | |
| 8,457,457 B2 | 6/2013 | Morioka | |
| 8,478,094 B2 | 7/2013 | Hsu | |
| 8,483,571 B2 | 7/2013 | MoColloch | |
| 8,548,288 B2 | 10/2013 | Raj | |
| 8,641,293 B2 | 2/2014 | Lin | |
| 8,673,407 B2 | 3/2014 | Bi | |
| 8,696,219 B2 | 4/2014 | McColloch | |
| 8,766,284 B1 | 7/2014 | Dutta | |
| 8,787,714 B2 | 7/2014 | Morioka | |
| 8,923,670 B2 | 12/2014 | Zbinden | |
| 9,063,281 B2 | 6/2015 | Lin | |
| 9,069,142 B2 | 6/2015 | Fortusini | |
| 9,134,489 B2 | 9/2015 | Zbinden | |
| 9,195,017 B2 | 11/2015 | Liao | |
| 9,223,098 B2 | 12/2015 | Morioka | |
| 9,250,401 B2 | 2/2016 | Lim | |
| 9,294,197 B2 | 3/2016 | Giziewicz | |
| 9,331,810 B2 | 5/2016 | Chen | |
| 9,354,394 B2 | 5/2016 | Li | |
| 9,360,642 B2 | 6/2016 | Morioka | |
| 9,417,409 B2 | 8/2016 | Howard | |
| 9,865,692 B2* | 1/2018 | Zhang | H01L 29/41758 |
| 9,971,089 B2* | 5/2018 | Zhang | G02B 6/12004 |
| 2002/0097962 A1 | 7/2002 | Yoshimura | |
| 2004/0126050 A1 | 7/2004 | Claydon | |
| 2004/0179784 A1 | 9/2004 | Vancoille | |
| 2005/0018981 A1 | 1/2005 | Modavis | |
| 2005/0249462 A1 | 11/2005 | Alduino | |
| 2005/0264811 A1* | 12/2005 | Bi | H01S 3/0632 |
| | | | 356/338 |
| 2006/0065900 A1 | 3/2006 | Hsieh | |
| 2006/0076571 A1 | 4/2006 | Hsieh | |
| 2007/0019910 A1 | 1/2007 | Greiner | |
| 2007/0036493 A1 | 2/2007 | Brenner | |
| 2008/0226228 A1 | 9/2008 | Tamura | |
| 2009/0103855 A1 | 4/2009 | Binkert et al. | |
| 2010/0014806 A1 | 1/2010 | Lee | |
| 2010/0027577 A1 | 2/2010 | Dutta | |
| 2010/0027947 A1* | 2/2010 | Dutta | G02B 6/12002 |
| | | | 385/88 |
| 2010/0029947 A1 | 2/2010 | Dutta | |
| 2010/0327424 A1 | 12/2010 | Braunisch | |
| 2011/0123151 A1 | 5/2011 | Zbinden | |
| 2011/0215344 A1* | 9/2011 | Dardy | H01L 29/66242 |
| | | | 257/83 |
| 2012/0063721 A1 | 3/2012 | Chen | |
| 2012/0077357 A1 | 3/2012 | Zou | |
| 2013/0156366 A1 | 6/2013 | Raj | |
| 2013/0301981 A1 | 11/2013 | Li | |
| 2014/0072311 A1 | 3/2014 | Giziewicz | |
| 2014/0226988 A1 | 8/2014 | Shao | |
| 2015/0043916 A1 | 2/2015 | Chen | |
| 2015/0331212 A1 | 11/2015 | Contag | |
| 2015/0333831 A1 | 11/2015 | Lai et al. | |
| 2016/0274316 A1 | 9/2016 | Verdiell | |
| 2017/0168235 A1 | 6/2017 | Zhang | |
| 2017/0279537 A1 | 9/2017 | Kim | |
| 2018/0372952 A1* | 12/2018 | Zhang | G02B 6/12004 |

OTHER PUBLICATIONS

International Preliminary Report on Patentability for International Patent Application No. PCT/US2016/055726, dated Jun. 21, 2018, 13 pages.

* cited by examiner

CHIP-TO-CHIP INTERCONNECT WITH EMBEDDED ELECTRO-OPTICAL BRIDGE STRUCTURES

CROSS-REFERENCE TO RELATED APPLICATIONS

This application is a continuation of U.S. patent application Ser. No. 14/964,426, filed on Dec. 9, 2015, the entire contents of which are hereby incorporated by reference herein.

BACKGROUND

1. Technical Field

The present invention relates generally to integrated circuits, and more particularly, but not exclusively, to silicon photonic structures to interconnect integrated circuit chips.

2. Background Art

A continuing focus of the microelectronics industry is the enablement of computer chips (also referred to as dies) having greater density, higher performance, and lower cost. As part of this effort, microelectronic packages containing multiple dies have been developed. Such multi-chip packages (MCPs) offer the potential for increased architectural flexibility at reduced cost but to do so must provide appropriate die-to-die interconnect densities in a way that is cost-effective. The interconnect density is an important consideration because an insufficient number of die connections would limit the bandwidth capability for the affected die interface, and thus logic-logic and/or logic-memory communications would suffer.

Existing interconnect architectures, such as those of on-package input/output (OPIO), use copper or other conductors as the transmission media for communication between two integrated circuit (IC) chips. These electrical interconnects are subject to loss and crosstalk degradation, especially when implemented in high density form factors. As successive generations of IC chips continue to scale in size and speed, existing chip interconnect technologies are reaching interconnect density limits, signaling rate limits and other design and operational constraints imposed by the use of electrical interconnects.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
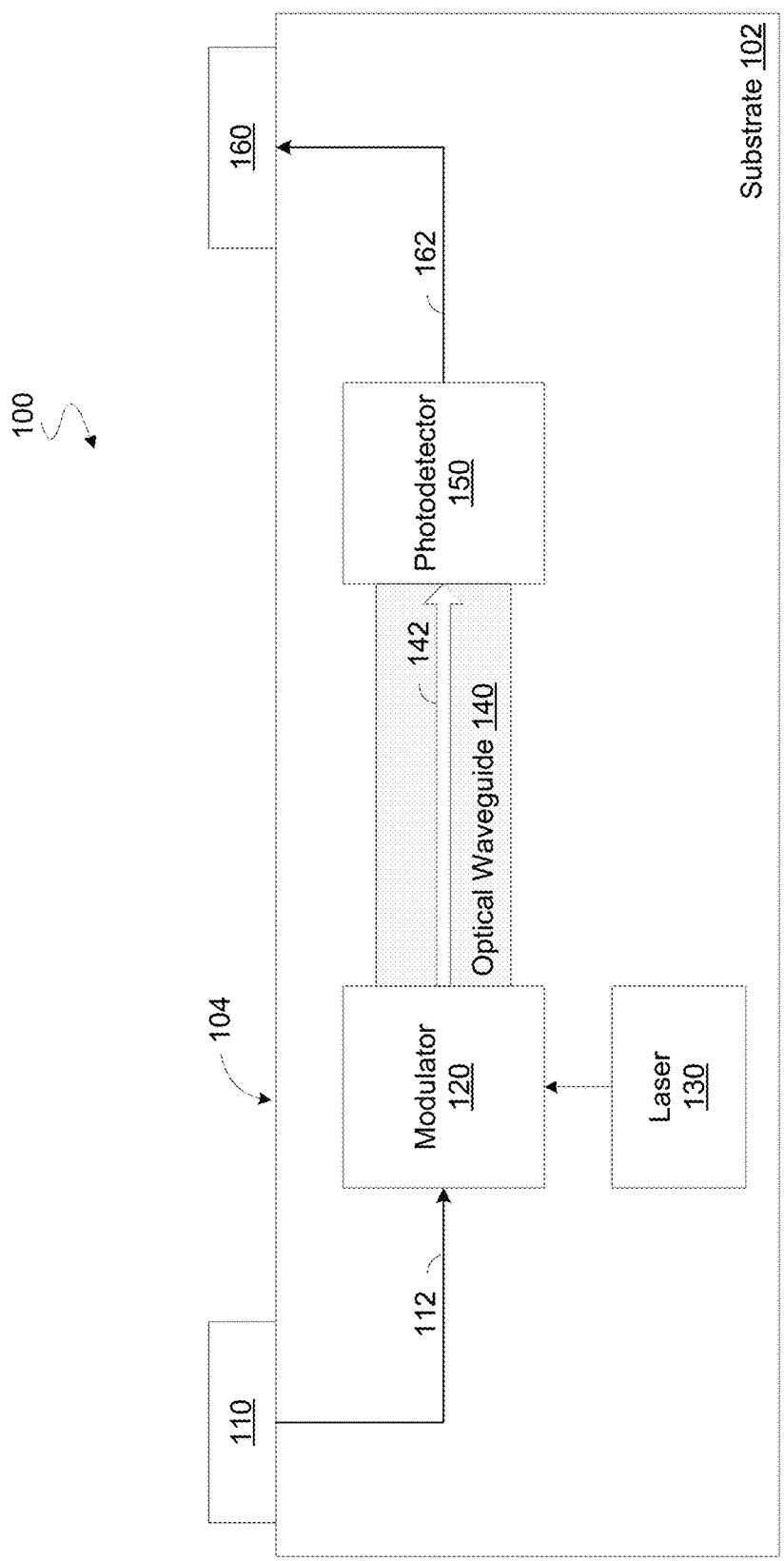
FIG. 1 is a function block diagram illustrating elements of an embedded bridge device according to an embodiment.

Embodiments discussed herein variously provide techniques and mechanisms for interconnecting integrated circuit devices with one or more bridge links integrated with a substrate. As compared to existing chip-to-chip interconnect devices, such a substrate may provide for relatively high density and/or high data rate transmissions. For example, some embodiments leverage the low loss and interference advantages of optical signaling to provide for significantly expanded and scalable chip-to-chip interconnect bandwidths. A device having embedded electrical and optical (electro-optical) bridge link features described herein may increase chip-to-chip interconnect signaling bandwidths—e.g., by 1-2 orders of magnitude as compared to a chip-to-chip bridge comprising only electrical interconnects.

Bridge link structures, according to one embodiment, may be integrated with a semiconductor substrate—e.g., where the substrate has formed therein and/or thereon conductive structures to facilitate electrical-domain interfacing with multiple IC devices. In an embodiment, a bridge link further includes an optical waveguide, electro-optical conversion structures and photodetector structures that are all integrated with the substrate. Such a bridge link may provide for an electrical-to-optical conversion, and a corresponding optical-to-electrical conversion, to take place within a single substrate that (for example) provides a chip-to-chip interconnect. Unless otherwise indicated herein, "bridge device" and "electro-optical bridge" refer to a device including such a substrate.

Some embodiments form optical waveguide structures in or on a semiconductor substrate for signal communication across a short (e.g., less than 5 centimeters) distance. Certain embodiments are described herein with reference to bridge link devices integrated with—e.g., formed in or on—a silicon-on-insulator (SOI) substrate. However, such discussion may be extended to additionally or alternatively apply to any of a variety of other semiconductor substrates that can accommodate the formation of interconnect structures described herein.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. Such devices may be portable or stationary. In some embodiments the technologies described herein may be employed in a desktop computer, laptop computer, smart phone, tablet computer, netbook computer, notebook computer, personal digital assistant, server, combinations thereof, and the like. More generally, the technologies described herein may be employed in any of a variety of electronic devices including a bridge device that, with a single contiguous substrate, converts signaling from an electrical domain to an optical domain and back to an electrical domain.

FIG. 1 shows a device 100 configured to operate as a bridge for exchanging signals according to an embodiment. Device 100 is one example of an embodiment comprising both an electrical-to-optical signal conversion mechanism and an optical-to-electrical conversion mechanism variously integrated with (e.g., formed in or on) the same substrate. Such conversion mechanisms may facilitate communication between circuitry (not shown) included in or coupled to device 100. In one illustrative embodiment, device 100 includes, or is to function as a component of, a multi-chip package (MCP)—e.g., where device 100 is to provide a chip-to-chip interconnect coupled between IC chips of the MCP.

As shown in FIG. 1, device 100 may include a substrate 102 and contacts 110, 160 disposed on substrate 102—e.g., where contacts 110, 160 include one or more pins, pads, bumps and/or other conductive interface structures. Contacts 110, 160 may be communicatively coupled to one another via structures—variously formed in or on substrate 102—that are to function as a bridge link. Such structures may include a conductive signal line 112, an electro-optical (in this context, electrical-to-optical) converter, an optical waveguide 140, a photodetector 150 and another conductive signal line 162. In the illustrative embodiment shown, the electro-optical converter includes a laser 130, such as an Indium Phosphide laser (for example), and a modulator 120 optically coupled to receive laser light from 130. However, the electro-optical converter may include any of a variety of additional or alternative mechanisms to generate an optical signal—e.g., including mechanisms adapted from conventional silicon photonics techniques. For example, an electro-optical converter in another embodiment may include a vertical-cavity surface-emitting laser (VCSEL) that is capable of implementing direct modulation of its laser light output.

Although certain embodiments are not limited in this regard, contacts 110, 160 may be disposed each at a same side 104 of substrate 102. In another embodiment, a bridge link is coupled between different (e.g., opposite) sides of a substrate. Device 100 may provide for a communication from contact 110 to contact 160. However, device 100 may implement any of a variety of one or more additional signal exchanges—e.g., to provide for a communication from contact 160 to contact 110

In an illustrative scenario according to one embodiment, signal 112 receives a first electrical signal from an integrated circuit (not shown) coupled to device 100 at contact 110. The electro-optical converter may generate an optical signal 142 based on the first electrical signal. By way of illustration and not limitation, modulator 120 may be coupled to signal line 112 and further optically coupled to receive laser light from laser 130. Based on the first electrical signal, modulator 120 may modulate the laser light from laser 130 to generate optical signal 142. Waveguide 140 may propagate optical signal 142 from modulator 120 to photodetector 150. In an embodiment, photodetector 150 comprises a photodiode, or other such integrated circuitry, that is optically coupled to convert optical signal 142 into a second electrical signal. In turn, the second signal may be provided via signal line 162 to contact 160 for an exchange from device 100—e.g., to an IC chip coupled at contact 160.

Figure 2:
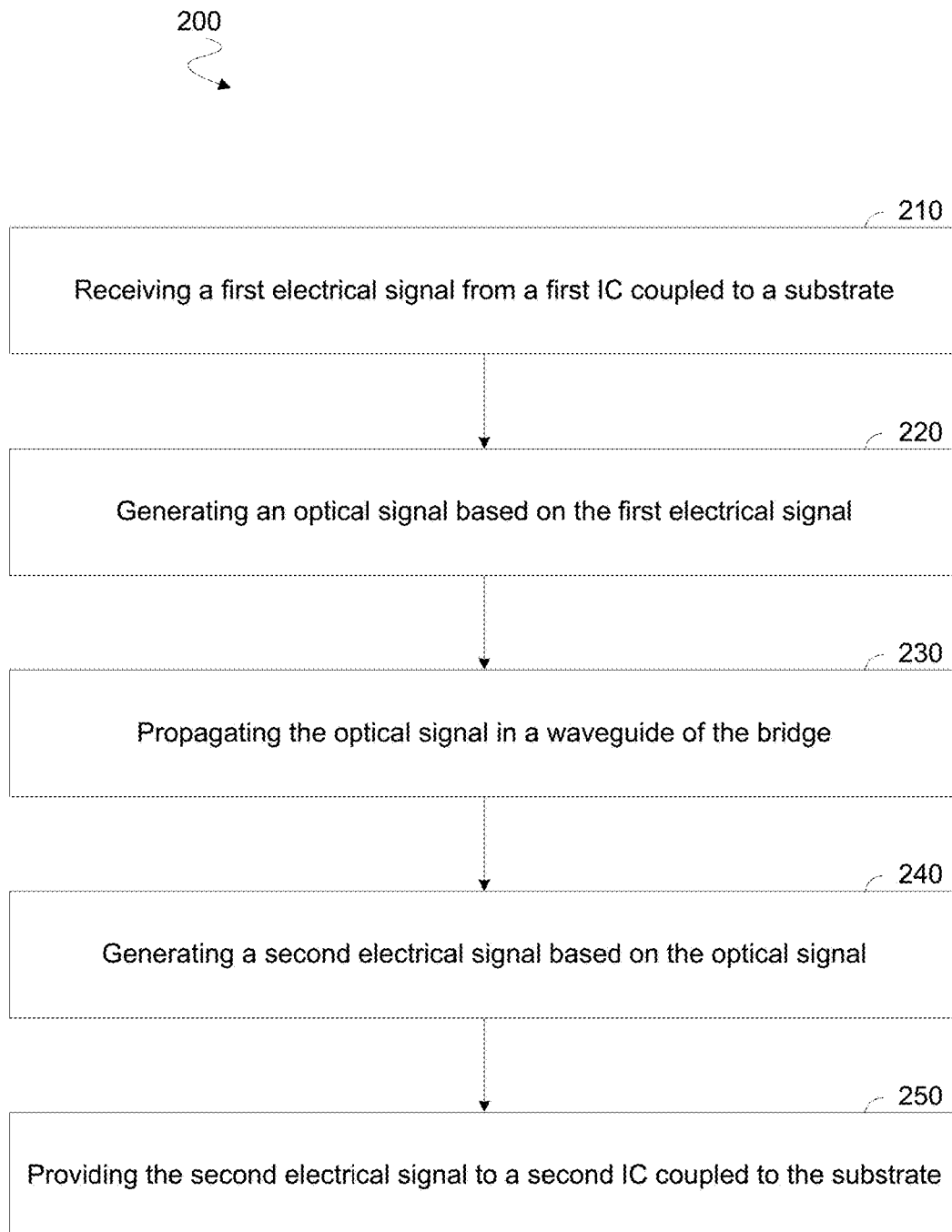
FIG. 2 is a flow diagram illustrating elements of a method of operating a bridge device according to an embodiment.

FIG. 2 illustrates elements of a method 200 to operate a bridge device according to an embodiment. Operations of method 200 may be performed with device 100, for example. In an embodiment, method 200 includes, at 210, receiving a first electrical signal from a first IC coupled to a substrate—e.g., substrate 102. The substrate may have variously formed therein or thereon integrated circuitry and photonic structures that are to provide a bridge link between a first contact disposed on the substrate and a second contact disposed on the substrate. In one embodiment, the substrate has a cross-sectional profile such as that of any of a variety of silicon on insulator (SOI) wafers currently used in silicon photonics.

At 220, method 200 may generate an optical signal based on the first electrical signal. The substrate may have formed therein a bridge link including an electro-optical converter that, for example, comprises a laser and a modulator to modulate light from the light laser, based on the first electrical signal, to generate a signal representing in the optical domain information included in the first electrical signal. Such an electro-optical converter may include structures adapted from conventional silicon photonics techniques. For example, a modulator of the converter may include any of a variety of conventional metal oxide semiconductor (MOS)—e.g., a complimentary MOS (CMOS)—phase modulators. The laser may include a III-V hybrid silicon laser, for example. Alternatively or in addition, the laser may output laser light having a wavelength in an infrared (IR) band—e.g., 750 nm to 1 mm. Certain embodiments are not limited with respect to a particular type of modulator or laser that may perform the generating at 220.

Method 200 may further comprise, at 230, propagating the optical signal in a waveguide of the bridge. The waveguide may comprise a silicon core that, for example, is formed on an insulator layer of the substrate. In some embodiments, an overall length of the optical waveguide is equal to or less than 10 centimeters (cm). For example, the length of the optical waveguide may be equal to or less than 5 cm and, in some embodiments, equal to or less than 3 cm. However, any of a variety of the additional or alternative waveguide lengths may be provided, according to different embodiments.

In an embodiment, method 200 further comprises, at 240, generating a second electrical signal based on the optical signal. For example, the second electrical signal may be generated at 240 with a photodiode or other photodetector that is integrated with the substrate and optically coupled with the waveguide. At 250, the second electrical signal generated at 240 may be provided to a second IC that is coupled to the substrate. For example, the bridge device may exchange the first electrical signal and the second electrical signal with respective IC chips via a same side (or, alternatively, via opposite sides) of the substrate.

In some embodiments, method 200 further includes operations (not shown) in aid of communicating a signal from the second IC to the first IC. For example, method 200 may further comprise receiving a third signal from the second IC—e.g., at a third contact disposed on the substrate—and, with the same bridge link of the electro-optical bridge (or alternatively a different bridge link), generating a second optical signal based on the third electrical signal. The second optical signal may be propagated in the waveguide (or a different waveguide), and a fourth electrical signal may be generated by a photodetector of the second bridge link based on the second optical signal. The fourth electrical signal may then be exchanged from the device to the first IC.

In some embodiments, an optical waveguide of a bridge link is dedicated to one pair of contacts coupled at opposite ends of the bridge link. In another embodiment, an optical waveguide is optically coupled to propagate various optical signals that are each to facilitate communication between a different respective pair of contacts. For example, multiple electro-optical converters, each integrated with a substrate, may be optically coupled each to output a respective optical signal at one end of the same optical waveguide. In such an embodiment, multiple photodetectors (also integrated with the same substrate) may be variously optically coupled to same waveguide, the photodetectors each to detect a corresponding one of such optical signals. Multiplexing to variously propagate such optical signals, and to variously detect the optical signals, may be coordinated by control signaling that, for example, is provided to the substrate by an IC that is a source and/or a sink of electrical signals exchanged with the substrate.

For example, method 200 may further include, in some embodiments, receiving a third signal from the first IC, wherein the first electrical signal and the third electrical signal are received at the bridge device via different respective contacts disposed on the substrate. A second optical signal may be generated, based on the third electrical signal, and propagated in the same waveguide of the bridge link. A fourth electrical signal may be generated, based on the second optical signal, and providing by the bridge link from the device to the second IC chip coupled at the substrate. In an embodiment, the second electrical signal and the fourth electrical signal are sent from the bridge device via different respective contacts disposed on the substrate.

Figure 3:
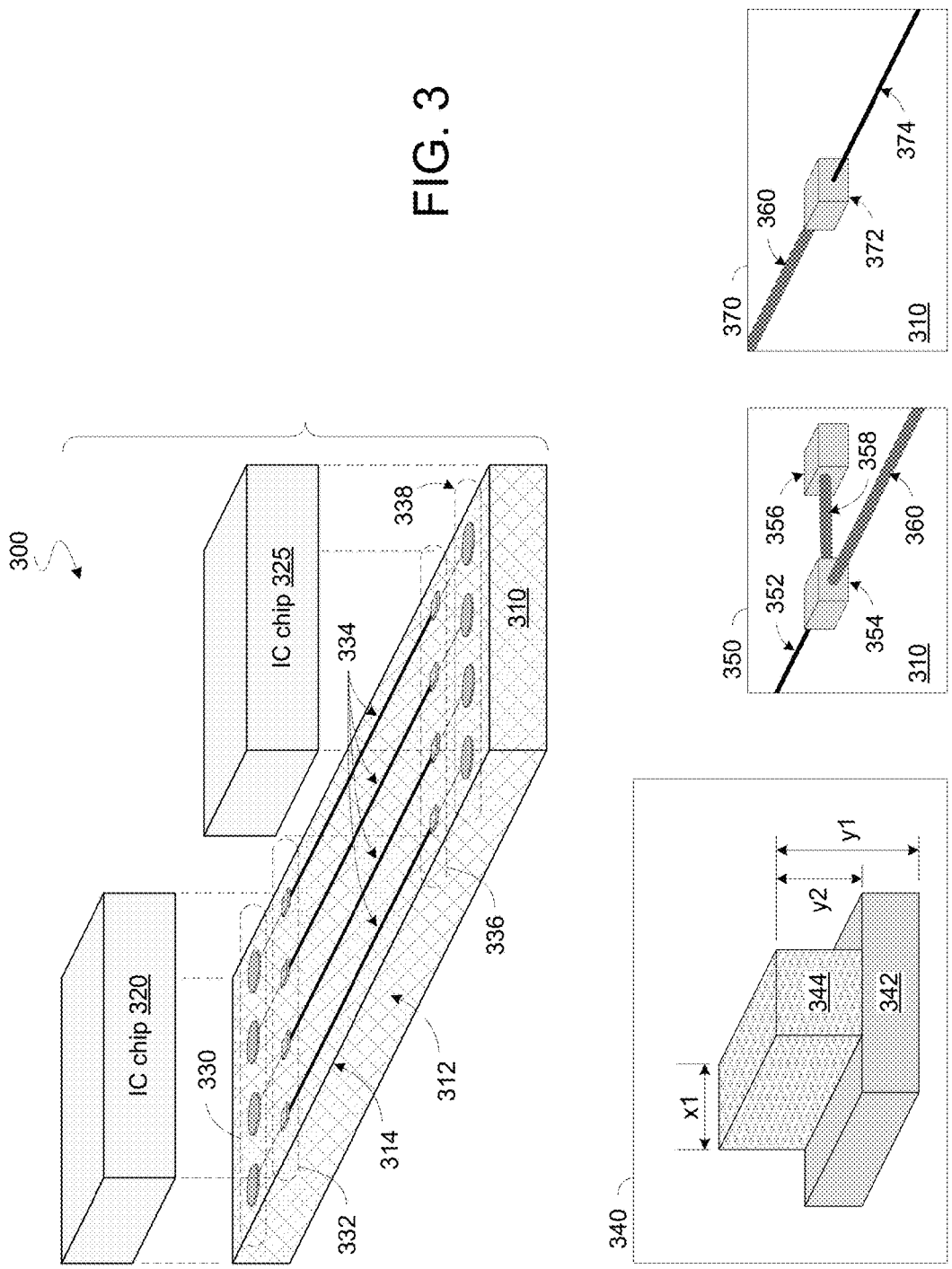
FIG. 3 is an exploded view of a system to exchange communications between integrated circuit chips according to an embodiment.

FIG. 3 shows an exploded view of a system 300 to exchange communications via one or more bridge links according to an embodiment. System 300 may include a MCP, for example. Operation of system 300 may be according to method 200. As shown in FIG. 3, system 300 includes a bridge device 310 and IC chips 320, 325 coupled thereto. Bridge device 310 may include some or all of the features of device 100, for example.

Device 310 includes a semiconductor substrate 312—e.g., having a SOI cross-sectional profile—where structures integrated with substrate 312 provide one or more bridge links to facilitate communication between IC chips 320, 325. For example, a side 314 of substrate 312 may have disposed thereon contacts 330 each to couple to a respective contact (not shown) of IC chip 320, and contacts 338 each to couple to a respective contact (not shown) of IC chip 325. In the example embodiment, device 310 includes four bridge links each to interconnect respective contacts of IC chips 320, 325. The four bridge links variously interconnect respective pairs of contacts 330, 338. The bridge links each include a respective one of electro-optical converters 332, one of optical waveguides 334 and one of photodetectors 336. The number of bridge links of device 310, and their configuration relative to one another, is merely illustrative, and not limiting on some embodiments. System 300 may comprise additional or alternative integrated circuit and photonic structures that, for example, facilitate communication from IC chip 325 to IC chip 320.

FIG. 3 also shows various detail views 340, 350, 370 of a bridge link integrated with substrate 312. As shown in view 340, one of the optical waveguides 334 may comprise a silicon core 344 that is formed over a layer 342 of buried oxide (BOX) material, such as $SiO_2$. The core 344 may have a width x1 and a height y2, where the core 344 and layer 342 have a combined height y1. In one illustrative embodiment, x1 is in a range of 2.5 microns (μm) to 5 μm, y2 is in a range of 1 μm to 2 μm, and y1 is in a range of 2.5 to 5 μm. However, such values may vary significantly according to implementation-specific details.

As shown in view 350, a conductive (e.g., copper) trace 352 may couple one of contacts 330 to a modulator 354 that is further optically coupled to receive light 358 from a laser 356. Based on an electrical signal received via trace 352, modulator 354 may modulate the received light 358 to generate an optical signal for propagation via an optical waveguide 360 (e.g., one of waveguides 334) such as that represented in detail view 340. As shown in detail view 370, the waveguide 360 may be coupled to provide the optical signal to a photodetector 372 of the bridge link. Photodetector 372 may convert the optical signal to a second electrical signal that is then sent, via another conductive trace 374, to one of contacts 338.

Figure 4:
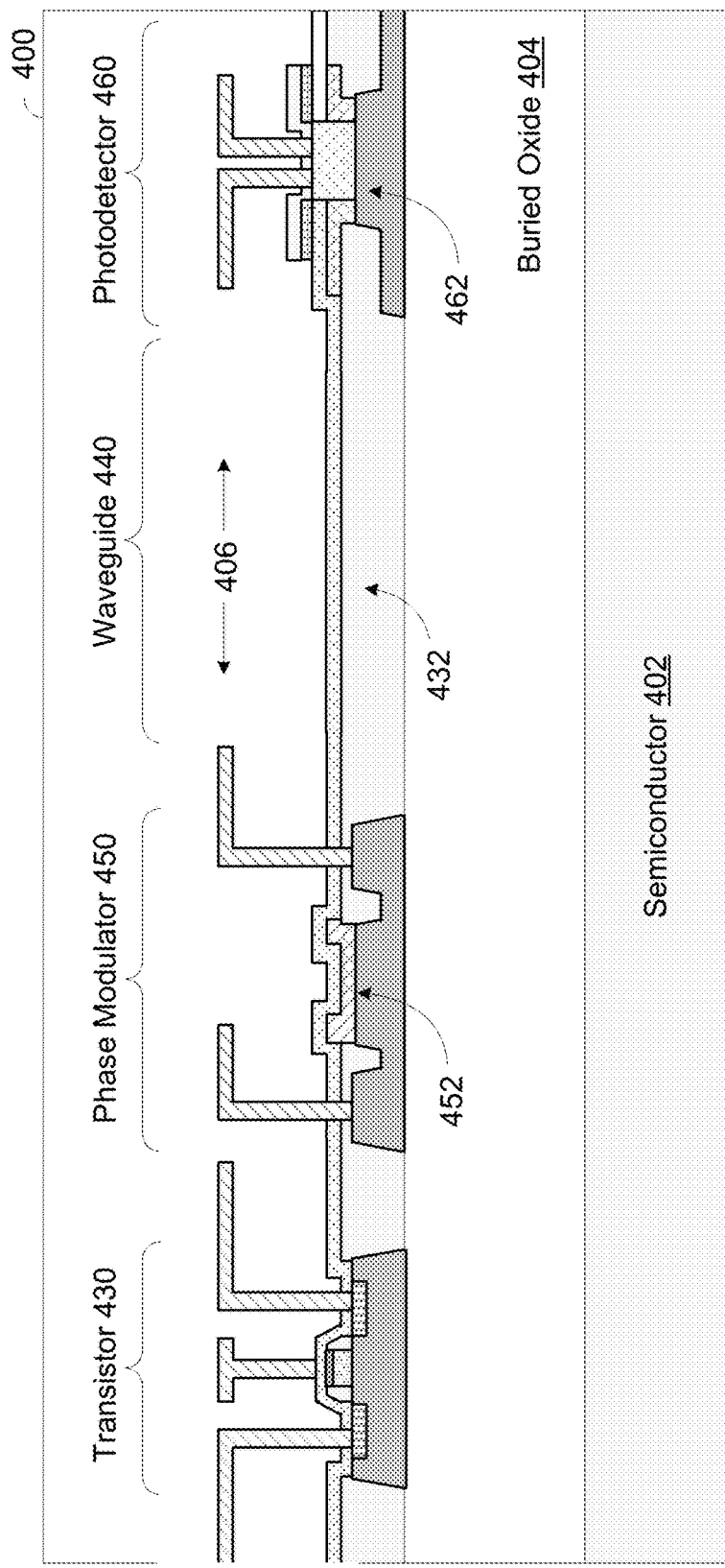
FIG. 4 is a cross-sectional view of components of an embedded bridge device according to an embodiment.

FIG. 4 shows a cross-sectional view of a device 400 to serve as a bridge for communication between integrated circuits according to an embodiment. Bridge functionality of device 400 may be similar to that provided by one of devices 100, 310, for example. In one illustrative embodiment, operation of device 400 is according to method 200.

Device 400 includes a substrate comprising a buried oxide 404 disposed between a semiconductor 402 and a silicon layer 432, in which or on which is formed various integrated circuitry and photonics structures to provide one or more bridge links. Such structures may include, for example, a transistor 430, a phase modulator 450, a waveguide 440 and a photodetector 460. One or more metal layers (e.g., including the illustrative metal layer 406) of device 400 may comprise traces to variously exchange signals for operation of the bridge link. The scale and relative configurations shown for structures of device 400 are merely illustrative, and not limiting on some embodiments.

Transistor 430 represents an optical transistor, a transistor laser or any of a variety of other devices configured to serve as a source of light that is to be used for generating an optical signal based on an electrical signal. Laser light may be generated based on a voltage difference applied—e.g., with electrodes of metal layer 406—across transistor 430. The laser light may be exchanged from transistor 430 to phase modulator 450 via a waveguide structure (not shown) in layer 432. In an embodiment, device 400 is coupled to receive an electrical signal from an integrated circuit device (not shown), where phase modulator 450 modulates the received light signal based on the received electrical signal. For example, such an electrical signal may be provided, with an electrode of metal layer 406, to selectively activate a phase shift region 452 of phase modulator 450. Phase shift region 452 may include Mach-Zehnder modulation structures and/or any of various other conventional phase modulation mechanisms.

The resulting modulated optical signal may then propagate via a waveguide 440 from phase modulator 450. In addition to buried oxide 404, cladding material (not shown) may aid in confining propagation of the optical signal to the waveguide 440. Based on the optical signal, a region 462 of photodetector 460 may be activated, resulting in the generation of another electrical signal that, for example, represents information of the first electrical signal received by device 400. The second electrical signal may subsequently be sent from device 400—e.g., to another IC chip (not shown) that is also coupled at a contact disposed on the substrate. In some embodiments, photodetector 460 includes or couples to additional integrated circuit of device 400 (not shown) that is to perform other electrical domain processing of the signal generated with photodetector 460.

Figure 5A:
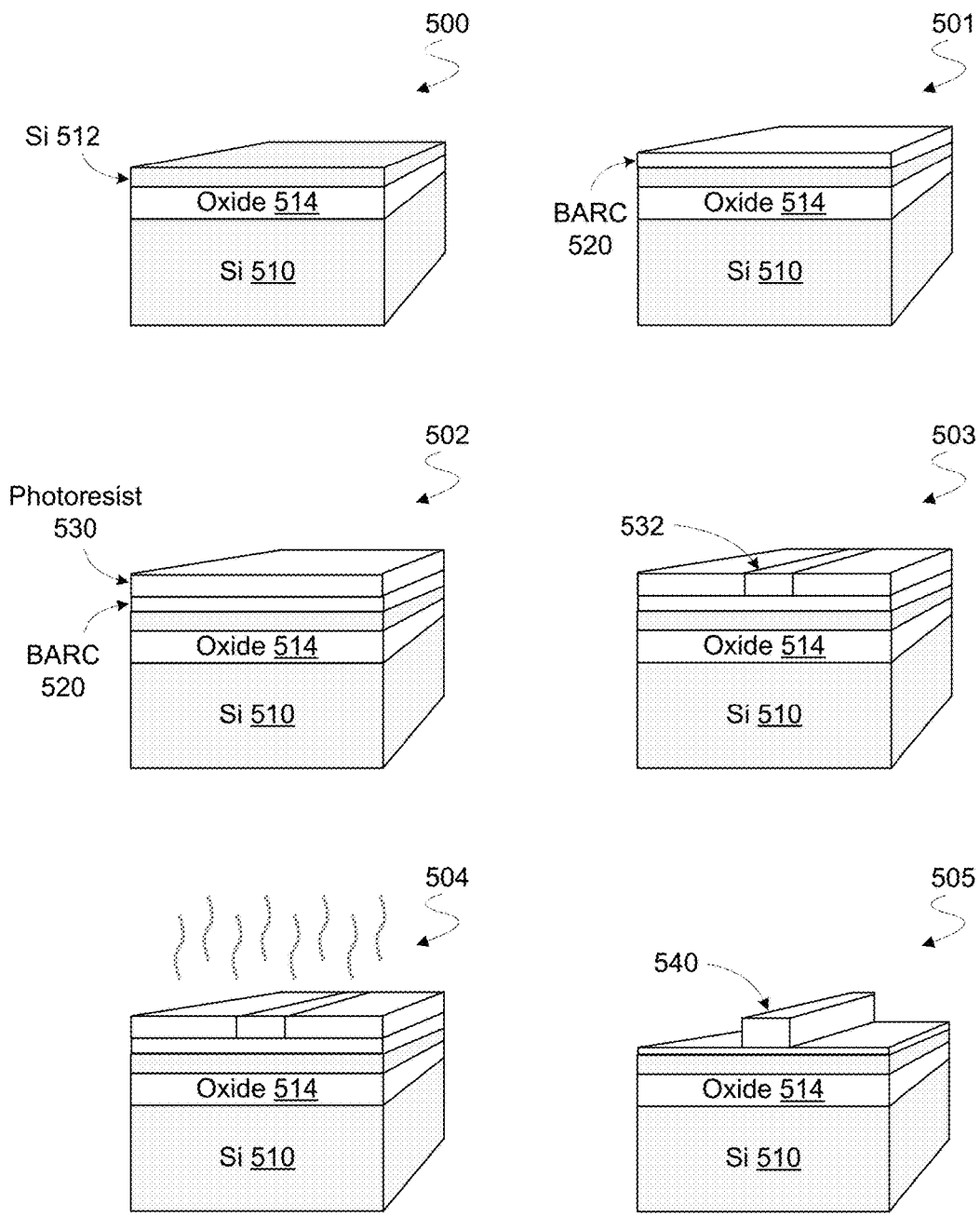
FIGS. 5A, 5B shows perspective views of various stages of processing to fabricate components of an embedded bridge device according to an embodiment.
Figure 5B:
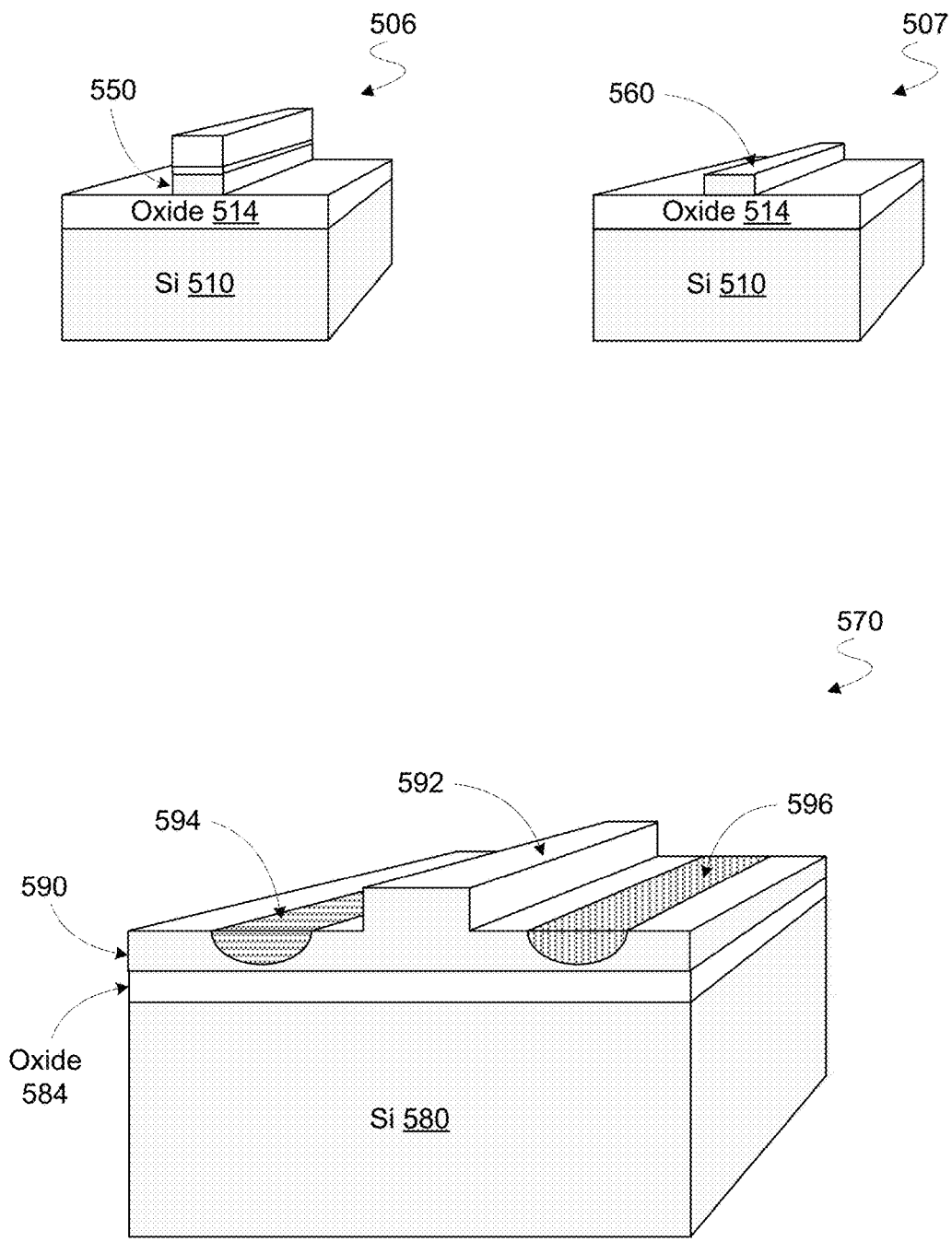

FIGS. 5A, 5B show variously stages 500-507 of a process to fabricate a bridge device according to an embodiment. The processing shown by FIGS. 5A, 5B is merely one illustration of a method, according to an embodiment, to fabricate an electro-optical bridge device such as one of devices 100, 310, 400, for example. Such processing may include operations adapted from conventional IC and photonics fabrication techniques, which are not detailed herein to avoid obscuring features of some embodiments.

As shown for stage 500, a SOI wafer may include a layer of oxide 514 (e.g., including silicon oxide) disposed between layers 510, 512 of silicon. At stage 501, a bottom anti-reflective coating (BARC) 520 may be disposed, and subsequently baked, on layer 512. Any of a variety of conventional organic or inorganic BARC materials may be adapted for the processing at stage 502. For example, BARC 520 may comprise an organic polymer such as one or more of polyimide, polystyrene and polyarylene. Alternatively or in addition, BARC 520 may comprise an inorganic base material such as SiO2, SiN, and SiON.

A photoresist 530 may then be formed over BARC 520 at stage 502. The photoresist 530 may then be subjected to ultraviolet, extreme ultraviolet, x-ray, electron projection, electron beam or other such patterned exposure, at stage 503, to form a pattern 532. BARC 520 may mitigate the amount of light that might otherwise re-enter photoresist 530 during such patterned exposure processing. In some embodiments, an additional post-exposure bake is performed, such as that at stage 504. Subsequently, a development stage 505 may selectively remove portions of photoresist 530, according to pattern 532, to form a resist structure 540. Subsequent processing, at stage 506, may etch away exposed regions of BARC 520 and silicon layer 512 to reveal sides 550 of a waveguide core structure. Subsequently, removal of remaining portions of photoresist 530 and BARC 520 may reveal a top side 560 of the waveguide core.

FIG. 5B further shows a cross-sectional view of an electro-optical bridge device 570 according to another embodiment. Bridge device 570 includes a buried oxide 584 disposed between silicon layers 580, 590. Silicon layer 590 may have formed therein structures of a PIN-type waveguide (where "PIN" in this context refers to an arrangement of p-type doped silicon, intrinsic silicon, and n-type silicon). For example, a waveguide structure 592 comprising intrinsic silicon may be disposed between an n+ doped region 594 and a p+ doped region 596. During operation of electro-optical bridge device 570, a voltage may be applied across n+ doped region 594 and p+ doped region 596, resulting in an active region that aids in mitigating an accumulation of electrons in waveguide structure 592. Such electrons that might otherwise absorb photons of an optical signal propagating in waveguide structure 592.

Figure 6:
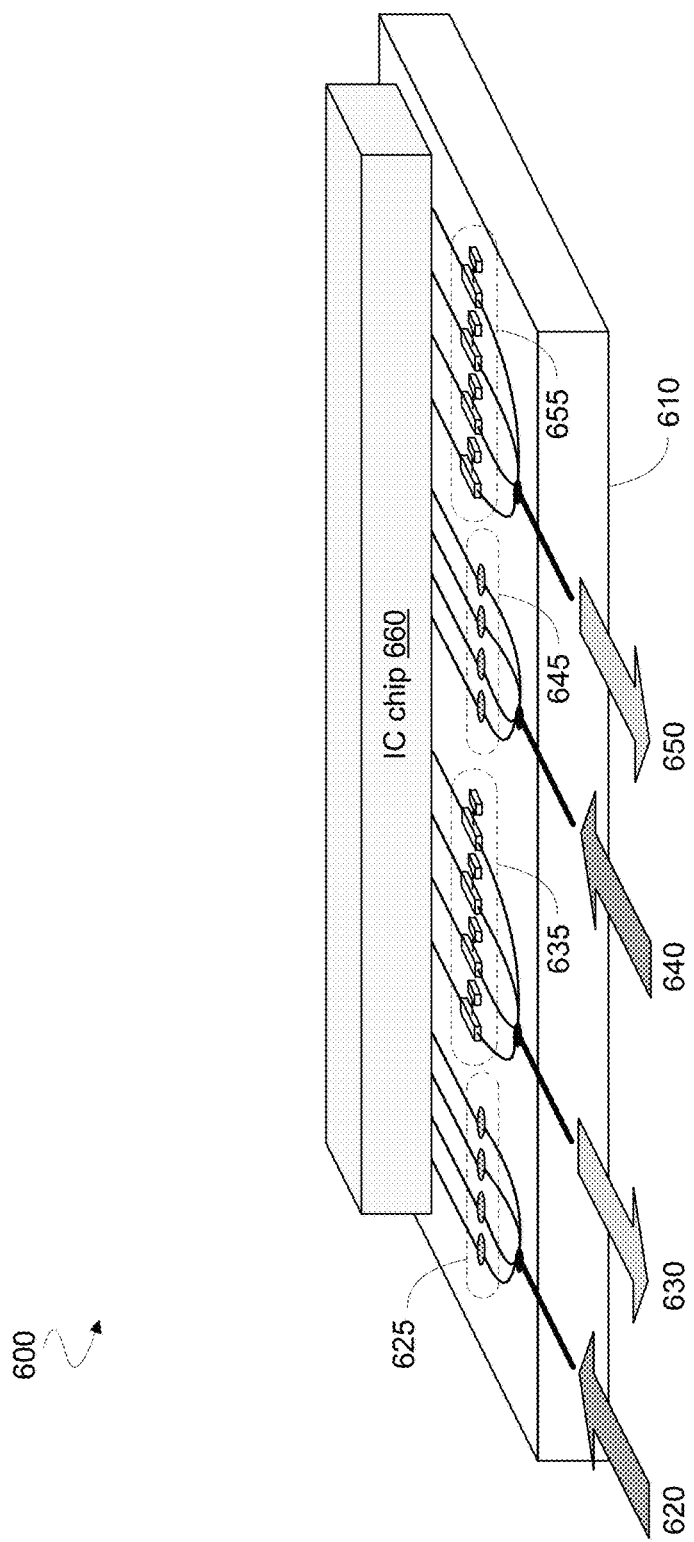
FIG. 6 is a perspective view of components in a system to exchange an optical signal according to an embodiment.

FIG. 6 shows an exploded view of a system 600 to exchange communications via one or more bridge links according to an embodiment. Operation of system 600 may be according to method 200, for example. In one embodiment, system 600 include some or all of the features of system 300. System 600 may include a bridge device 610 and multiple IC chips—including the illustrative IC chip 660—coupled thereto. Bridge device 610 may include features of one of devices 100, 310, 400, for example.

Device 610 includes a semiconductor substrate with integrated structures to provide multiple bridge links each to interconnect IC chip 660 with a respective IC chip of one or more other IC chips (not shown) also coupled at device 610. In the illustrative embodiment shown, device 610 comprises four bridge links including two optical waveguides 620, 640 to transmit respective data to IC chip 660 and two other optical waveguides 630, 650 to transmit respective data from IC chip 660. Some or all bridge links of device 610 may variously support multiplexed communication of multiple signals.

By way of illustration and not limitation, the bridge link comprising optical waveguide 630 may also include electro-optical converters 635 variously coupled each between optical waveguide 630 and a respective one of multiple conductive traces formed in the substrate. IC chip 660 may variously send electrical signals, via different ones of such traces, for conversion by electro-optical converters 635 each into a corresponding optical signal. Each of electro-optical converters 635 may be optically coupled to output a respective optical signal for propagation via optical waveguide 630. IC chip 660 may selectively time the sending of electric signals to implement, for example, a time multiplexed communication of optical signals via waveguide 630. Alternatively or in addition, the bridge link including optical waveguide 650 may further comprise electro-optical converters 655 that, similarly, are variously coupled each to receive a respective electrical signal from IC chip 660 and to convert the signal into a corresponding optical signal for propagation via waveguide 650.

In some embodiments, a bridge link functionality may be additionally or alternatively provided for signal reception by IC chip 660. For example, the bridge link comprising optical waveguide 620 may include photodetectors 625 each coupled between optical waveguide 620 and a respective one of multiple conductive traces formed in the substrate of device 610. The traces may be variously coupled to interface contacts (not shown) of IC chip 660. In such an embodiment, multiplexed optical signals may be variously provided to photodetectors 625 via waveguide 620, where photodetectors 625 are variously signaled—e.g., by IC chip 660, a clock signal or other control mechanism (not shown)—each to selectively sample a corresponding one of the multiplexed signals. The sampled optical signals may be variously converted to respective electrical signals and sent from device 610 each to a corresponding interface contact of IC chip 660.

Alternatively or in addition, the bridge link including optical waveguide 640 may further comprise photodetectors 645 variously coupled each between optical waveguide 640 and a respective trace of device 610. Such traces may, in turn, be coupled to respective interface contacts of IC chip 660. In such an embodiment, time multiplexed optical signals may be variously provided via waveguide 640 to photodetectors 645. Photodetectors 645 may be variously signaled each to selectively sample a corresponding one of the multiplexed signals. The sampled optical signals may be converted to respective electrical signals and variously sent each to a corresponding interface contact of IC chip 660.

Figure 7:
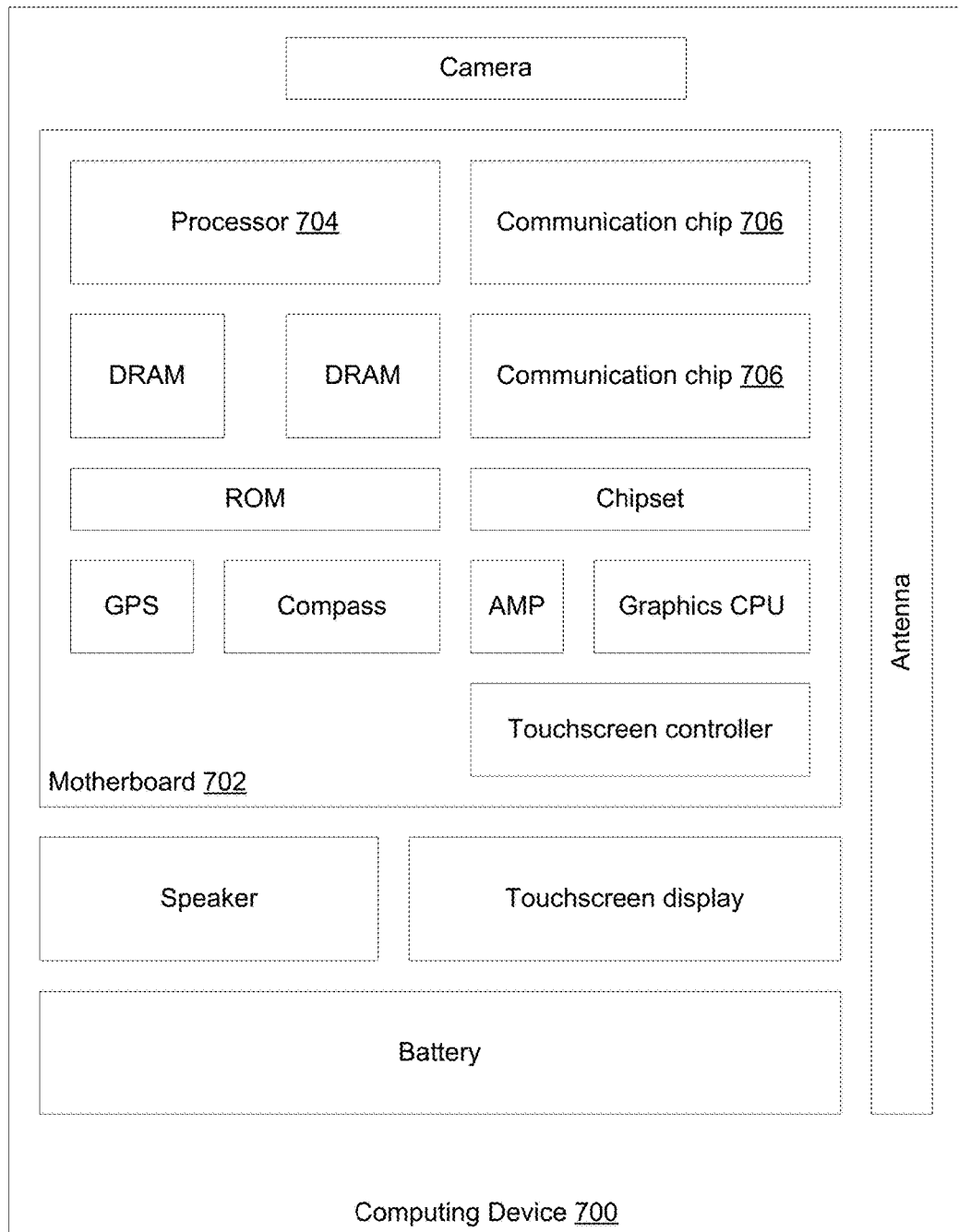
FIG. 7 illustrates a computing device in accordance with one implementation of the invention.

FIG. 7 illustrates a computing device 700 in accordance with one embodiment. The computing device 700 houses a board 702. The board 702 may include a number of components, including but not limited to a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704.

Depending on its applications, computing device 700 may include other components that may or may not be physically and electrically coupled to the board 702. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. The term "processor" may refer to any device or portion of a device that processes electronic data from registers and/or memory to transform that electronic data into other electronic data that may be stored in registers and/or memory. The communication chip 706 also includes an integrated circuit die packaged within the communication chip 706.

In various implementations, the computing device 700 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 700 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 8:
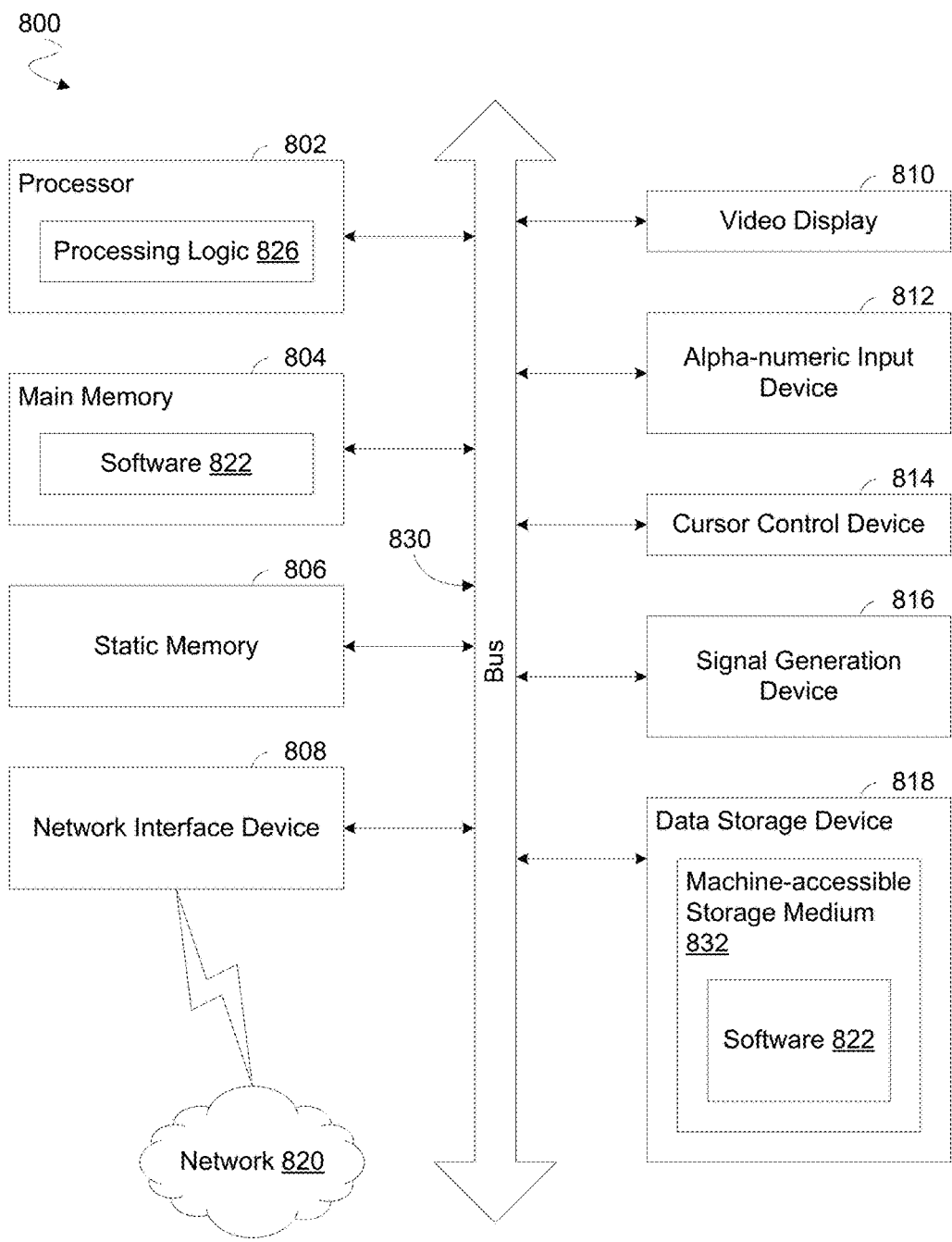
FIG. 8 illustrates a block diagram of an exemplary computer system, in accordance with an embodiment of the present invention.

FIG. 8 illustrates a diagrammatic representation of a machine in the exemplary form of a computer system 800 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations described herein.

The computer system 800 may further include a network interface device 808. The computer system 800 also may include a video display unit 810 (e.g., a liquid crystal display (LCD), a light emitting diode display (LED), or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-accessible storage medium (or more specifically a computer-readable storage medium) 832 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface device 808.

While the machine-accessible storage medium 832 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Figure 9:
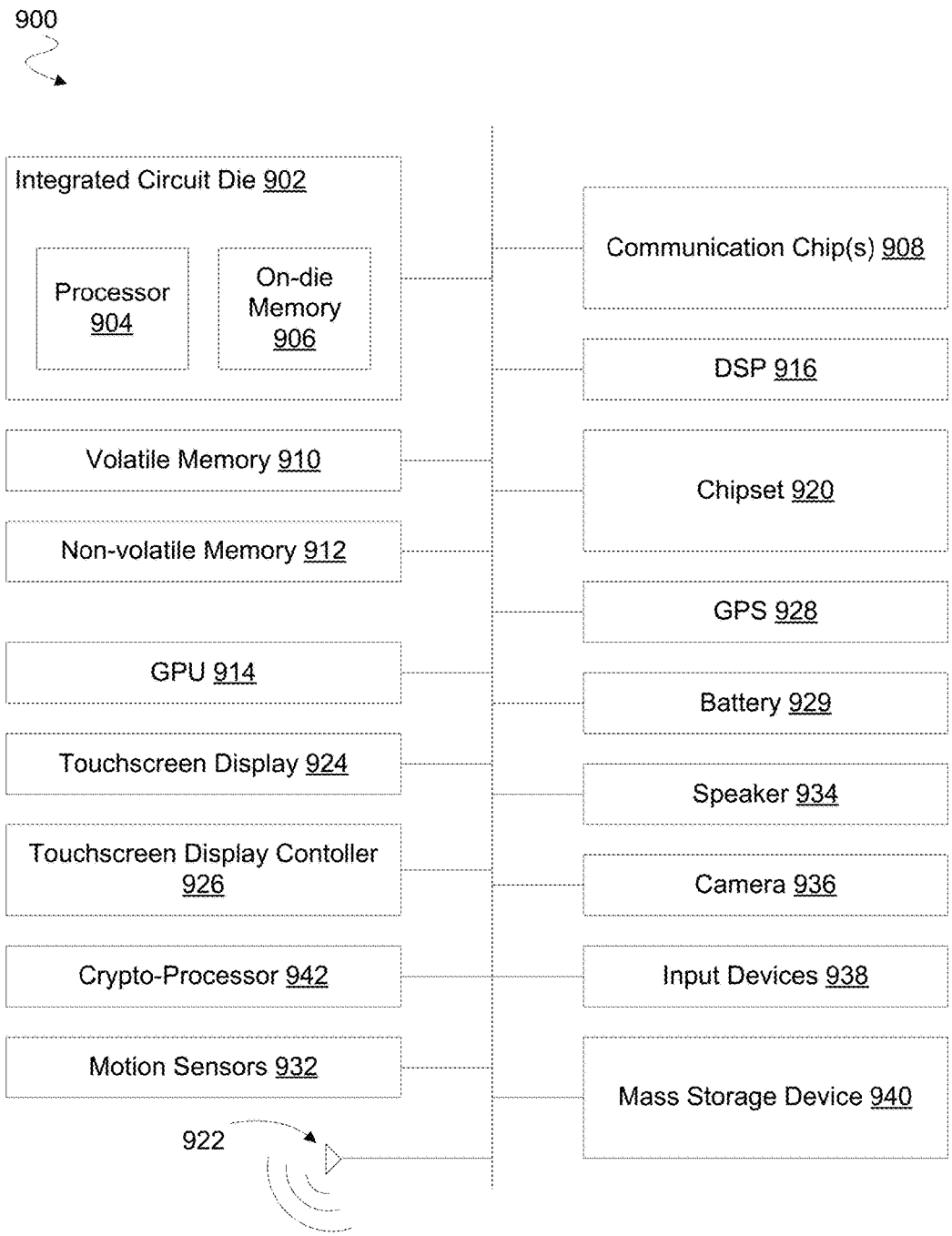
FIG. 9 is a computing device built in accordance with an embodiment of the invention.

FIG. 9 illustrates a computing device 900 in accordance with one embodiment. The computing device 900 may include a number of components. In one embodiment, these components are attached to one or more motherboards. In an alternate embodiment, these components are fabricated onto a single system-on-a-chip (SoC) die rather than a motherboard. The components in the computing device 900 include, but are not limited to, an integrated circuit die 902 and at least one communication chip 908. In some implementations the communication chip 908 is fabricated as part of the integrated circuit die 902. The integrated circuit die 902 may include a CPU 904 as well as on-die memory 906, often used as cache memory, that can be provided by technologies such as embedded DRAM (eDRAM) or spin-transfer torque memory (STTM or STTM-RAM).

Computing device 900 may include other components that may or may not be physically and electrically coupled to the motherboard or fabricated within an SoC die. These other components include, but are not limited to, volatile memory 910 (e.g., DRAM), non-volatile memory 912 (e.g., ROM or flash memory), a graphics processing unit 914 (GPU), a digital signal processor 916, a crypto processor 942 (a specialized processor that executes cryptographic algorithms within hardware), a chipset 920, an antenna 922, a display or a touchscreen display 924, a touchscreen controller 926, a battery 929 or other power source, a power amplifier (not shown), a global positioning system (GPS) device 928, a compass 930, a motion coprocessor or sensors 932 (that may include an accelerometer, a gyroscope, and a compass), a speaker 934, a camera 936, user input devices 938 (such as a keyboard, mouse, stylus, and touchpad), and a mass storage device 940 (such as hard disk drive, compact disk (CD), digital versatile disk (DVD), and so forth).

The communications chip 908 enables wireless communications for the transfer of data to and from the computing device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 908 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 900 may include a plurality of communication chips 908. For instance, a first communication chip 908 may be dedicated to shorter range wireless communications such as Wi-Fi and Bluetooth and a second communication chip 908 may be dedicated to longer range wireless communications such as GPS, EDGE, GPRS, CDMA, WiMAX, LTE, Ev-DO, and others.

The term "processor" may refer to any device or portion of a device that processes electronic data from registers and/or memory to transform that electronic data into other electronic data that may be stored in registers and/or memory. In various embodiments, the computing device 900 may be a laptop computer, a netbook computer, a notebook computer, an ultrabook computer, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 900 may be any other electronic device that processes data.

In one implementation, a device comprises a substrate, a first contact and a second contact to couple the substrate, respectively, to a first integrated circuit (IC) chip and to a second IC chip, and a bridge link integrated with the substrate and coupled between the first contact and the second contact. The bridge link includes a first trace to receive a first electrical signal via the first contact, a first electro-optical converter coupled to receive the first signal and to generate a first optical signal based on the first electrical signal, a first waveguide coupled to receive and propagate the first optical signal, a first photodetector coupled to receive the first optical signal from the first waveguide and to generate a second electrical signal based on the first optical signal, and a second trace to exchange the second electrical signal between the first photodetector and the second contact.

In an embodiment, a length of the waveguide is equal to or less than 10 centimeters (cm). In another embodiment, a length of the waveguide is equal to or less than 5 cm. In another embodiment, a length of the waveguide is equal to or less than 3 cm. In another embodiment, the device further comprises a third contact and a fourth contact to couple the substrate, respectively, to the second IC chip and to the first IC chip, and another bridge link integrated with the substrate and coupled between the third contact and the fourth contact. The other bridge link includes a third trace to receive a third electrical signal via the third contact, a second electro-optical converter coupled to receive the third signal and to generate a second optical signal based on the third electrical signal, a second waveguide coupled to receive and propagate the second optical signal, a second photodetector coupled to receive the second optical signal from the second waveguide and to generate a fourth electrical signal based on the second optical signal, and a fourth trace to exchange the fourth electrical signal between the second photodetector and the fourth contact.

In another embodiment, the device further comprises a third contact and a fourth contact to couple the substrate, respectively, to the first IC chip and to the second IC chip, wherein the bridge link further comprises a third trace to receive a third electrical signal via the third contact, a second electro-optical converter coupled to receive the third signal and to generate a second optical signal based on the third electrical signal, wherein the first waveguide to further propagate the second optical signal, a second photodetector coupled to receive the second optical signal from the first waveguide and to generate a fourth electrical signal based on the second optical signal, and a fourth trace to exchange the fourth electrical signal between the second photodetector and the fourth contact. In another embodiment, the first contact and the second contact are each disposed on a first side of the substrate. In another embodiment, a multi-chip package includes the device, the first IC chip and the second IC chip.

In another implementation, a system comprises a first integrated circuit (IC) chip, a second IC chip, and a bridge device including a substrate, a first contact and a second contact disposed on the substrate, the first contact and the second contact coupled, respectively, to the first IC chip and to the second IC chip, and a bridge link integrated with the substrate and coupled between the first contact and the second contact. The bridge link includes a first trace to receive a first electrical signal via the first contact, a first electro-optical converter coupled to receive the first signal and to generate a first optical signal based on the first electrical signal, a first waveguide coupled to receive and propagate the first optical signal, a first photodetector coupled to receive the first optical signal from the first waveguide and to generate a second electrical signal based on the first optical signal, and a second trace to exchange the second electrical signal between the first photodetector and the second contact.

In another embodiment, a length of the waveguide is equal to or less than 10 centimeters (cm). In another embodiment, a length of the waveguide is equal to or less than 5 cm. In another embodiment, a length of the waveguide is equal to or less than 3 cm. In another embodiment, the bridge device further comprises a third contact and a fourth contact to couple the substrate, respectively, to the second IC chip and to the first IC chip, and another bridge link integrated with the substrate and coupled between the third contact and the fourth contact. The other bridge link includes a third trace to receive a third electrical signal via the third contact, a second electro-optical converter coupled to receive the third signal and to generate a second optical signal based on the third electrical signal, a second waveguide coupled to receive and propagate the second optical signal, a second photodetector coupled to receive the second optical signal from the second waveguide and to generate a fourth electrical signal based on the second optical signal, and a fourth trace to exchange the fourth electrical signal between the second photodetector and the fourth contact.

In another embodiment, the bridge device further comprises a third contact and a fourth contact to couple the substrate, respectively, to the first IC chip and to the second IC chip, wherein the bridge link further comprises a third trace to receive a third electrical signal via the third contact, a second electro-optical converter coupled to receive the third signal and to generate a second optical signal based on the third electrical signal, wherein the first waveguide to further propagate the second optical signal, a second photodetector coupled to receive the second optical signal from the first waveguide and to generate a fourth electrical signal based on the second optical signal, and a fourth trace to exchange the fourth electrical signal between the second photodetector and the fourth contact. In another embodiment, a multi-chip package includes the device, the first IC chip and the second IC chip.

In another implementation, a non-transitory computer-readable storage medium has stored thereon instructions which, when executed by one or more processing units, cause the one or more processing units to perform a method comprising providing to a bridge device a first signal from a first integrated circuit coupled to the bridge device, and with a bridge link integrated with a substrate of the bridge device, generating a first optical signal based on the first electrical signal, propagating the first optical signal in a waveguide of the bridge link, generating a second electrical signal based on the first optical signal, and providing the second electrical signal to a second integrated circuit coupled to the substrate.

In an embodiment, a length of the waveguide is equal to or less than 10 centimeters (cm). In another embodiment, the method further comprises receiving at the bridge device a third signal from the second integrated circuit, and with another bridge link integrated with the substrate, generating a second optical signal based on the third electrical signal, propagating the second optical signal in a waveguide of the other bridge link, generating a fourth electrical signal based on the second optical signal, and providing the fourth electrical signal to the first integrated circuit. In another embodiment, the method further comprises receiving at the bridge device a third signal from the first integrated circuit, wherein the first electrical signal and the third electrical signal are received at the bridge device via different respective contacts disposed on the substrate, and with the bridge link, generating a second optical signal based on the third electrical signal, propagating the second optical signal in the waveguide, generating a fourth electrical signal based on the second optical signal, and providing the fourth electrical signal to the second integrated circuit, wherein the second electrical signal and the fourth electrical signal are sent from the bridge device via different respective contacts disposed on the substrate.

In another implementation, a method at a bridge device comprises receiving a first signal from a first integrated circuit coupled to a substrate of the bridge device, and with a bridge link integrated with the substrate, generating a first optical signal based on the first electrical signal, propagating the first optical signal in a waveguide of the bridge link, generating a second electrical signal based on the first optical signal, and providing the second electrical signal to a second integrated circuit coupled to the substrate.

In an embodiment, a length of the waveguide is equal to or less than 10 centimeters (cm). In another embodiment, the method further comprises receiving at the bridge device a third signal from the second integrated circuit, and with another bridge link integrated with the substrate, generating a second optical signal based on the third electrical signal, propagating the second optical signal in a waveguide of the other bridge link, generating a fourth electrical signal based on the second optical signal, and providing the fourth electrical signal to the first integrated circuit.

In another embodiment, the method further comprises receiving at the bridge device a third signal from the first integrated circuit, wherein the first electrical signal and the third electrical signal are received at the bridge device via different respective contacts disposed on the substrate, and with the bridge link, generating a second optical signal based on the third electrical signal, propagating the second optical signal in the waveguide, generating a fourth electrical signal based on the second optical signal, and providing the fourth electrical signal to the second integrated circuit, wherein the second electrical signal and the fourth electrical signal are sent from the bridge device via different respective contacts disposed on the substrate.

Techniques and architectures for interconnecting integrated circuitry are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
    a semiconductor substrate comprising a silicon layer on an insulating layer;
        a first contact and a second contact to couple the semiconductor substrate, respectively, to a first integrated circuit (IC) chip and to a second IC chip; and
        a bridge link integrated with the semiconductor substrate and coupled between the first contact and the second contact, the bridge link including:
            a first trace formed in or on the semiconductor substrate, the first trace coupled to receive a first electrical signal via the first contact;
            a second trace formed in or on the semiconductor substrate, the second trace to provide a second electrical signal to the second contact;
            a first electro-optical converter formed in the semiconductor substrate, the first electro-optical converter coupled to receive the first signal and to generate a first optical signal based on the first electrical signal, the first electro-optical convertor comprising a phase modulator and a transistor formed in the silicon layer of the semiconductor substrate; and
            a first waveguide formed in the silicon layer of the semiconductor substrate, between the first trace and the second trace, the first waveguide coupled to receive and propagate the first optical signal.

2. The device of claim 1 further, comprising:
    a first photodetector coupled to receive the first optical signal from the first waveguide and to generate the second electrical signal.

3. The device of claim 1, wherein a length of the first waveguide is equal to or less than 10 centimeters (cm).

4. The device of claim 3, wherein a length of the first waveguide is equal to or less than 5 cm.

5. The device of claim 4, wherein a length of the waveguide is equal to or less than 3 cm.

6. The device of claim 1, further comprising:
    a third contact and a fourth contact to couple the semiconductor substrate, respectively, to the second IC chip and to the first IC chip; and
    another bridge link integrated with the semiconductor substrate and coupled between the third contact and the fourth contact, the other bridge link including:
    a third trace to receive a third electrical signal via the third contact;
    a fourth trace; and
    a second waveguide between the third trace and the fourth trace.

7. The device of claim 1, further comprising a third contact and a fourth contact to couple the semiconductor substrate, respectively, to the first IC chip and to the second IC chip, wherein the bridge link further comprises:
    a third trace to receive a third electrical signal via the third contact; and
    a fourth trace coupled to the fourth contact.

8. The device of claim 1, wherein the first contact and the second contact are each disposed on a first side of the semiconductor substrate.

9. The device of claim 1, wherein a multi-chip package includes the device, the first IC chip and the second IC chip.

* * * * *